(12) United States Patent
Na et al.

(10) Patent No.: US 9,361,591 B2
(45) Date of Patent: Jun. 7, 2016

(54) APPARATUS AND METHOD FOR BUILDING MAP OF PROBABILITY DISTRIBUTION BASED ON PROPERTIES OF OBJECT AND SYSTEM

(71) Applicant: ELECTRONICS & TELECOMMUNICATIONS RESEARCH INSTITUTE, Daejeon (KR)

(72) Inventors: Ki In Na, Daejeon (KR); Jae Min Byun, Deajeon (KR); Myung Chan Roh, Daejeon (KR); Joo Chan Sohn, Daejeon (KR); Sung Hoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 291 days.

(21) Appl. No.: 14/065,615

(22) Filed: Oct. 29, 2013

(65) Prior Publication Data

US 2014/0122409 A1      May 1, 2014

(30) Foreign Application Priority Data

Oct. 29, 2012   (KR) .................. 10-2012-0120657

(51) Int. Cl.
  *G06N 5/04*     (2006.01)
  *G06N 99/00*    (2010.01)
(52) U.S. Cl.
  CPC .................. *G06N 99/005* (2013.01)
(58) Field of Classification Search
  CPC ........ G06N 5/04; G06N 5/048; G06N 99/005
  USPC ........................................................ 706/52
  See application file for complete search history.

(56) References Cited

U.S. PATENT DOCUMENTS

2003/0233214 A1* 12/2003 Kreichauf .............. G05B 17/02
                                                        702/181
2005/0216181 A1*  9/2005 Estkowski ........... G05D 1/0212
                                                        701/411

(Continued)

FOREIGN PATENT DOCUMENTS

KR   10-2008-0029239 A    4/2008
KR   10-2011-0026776 A    3/2011

OTHER PUBLICATIONS

Pradalier C. et al., "The CyCab: a car-like robot navigating autonomously and safely among pedestrians", Robotics and Autonomous Systems, 50, 2005, pp. 51-67.*
Miura J. et al., "Modeling Motion Uncertainty of Moving Obstacles for Robot Motion Planning", Proceedings of the 2000 IEEE International Conference on Robotics & Automation, San Francisco, CA, Apr. 2000.*

(Continued)

*Primary Examiner* — Stanley K Hill
*Assistant Examiner* — Dave Misir
(74) *Attorney, Agent, or Firm* — LRK Patent Law Firm (57) ABSTRACT

An apparatus and method for building a map of probability distribution are provided. The apparatus for building the map of probability distribution includes: a sensor information collector configured to collect sensor information from a plurality of sensors; as object recognizer configured to recognize an object by integrating and inferring the sensor information, and to acquire object information; and a probability distribution creator configured to determine whether to apply an object property model including at least one of kinematic properties, shape properties, and probabilistic properties in correspondence to the object information, to acquire object properties corresponding to the object information, and to create a probability distribution based on foe object properties. Accordingly, it is possible to build a map with high reliability.

14 Claims, 4 Drawing Sheets

(56) References Cited

U.S. PATENT DOCUMENTS

| | | | |
|---|---|---|---|
| 2010/0070078 A1* | 3/2010 | Kong | G05D 1/0274 700/259 |
| 2010/0161225 A1* | 6/2010 | Hyung | G06T 7/2006 701/301 |
| 2011/0052043 A1* | 3/2011 | Hyung | G06T 7/208 382/154 |
| 2011/0082585 A1 | 4/2011 | Sofman et al. | |
| 2012/0232795 A1* | 9/2012 | Robertson | G01C 22/006 701/532 |
| 2013/0223686 A1* | 8/2013 | Shimizu | G06K 9/00624 382/103 |

OTHER PUBLICATIONS

Ess A. et al., "Object Detection and Tracking for Autonomous Navigation in Dynamic Environments", The International Journal of Robotics Research, 29(14), pp. 1707-1725, 2010.*

Thrun S., "Robotic Mapping: A Survey", School of Computer Science, Carnegie Mellon University, Pittsburgh, PA 15213, Feb. 2002.*

Kim Sung Shin et al., "Method for Path-Planning for Actual Robots", KR20110026776 (A), Mar. 16, 2011.*

Yu-Cheol Lee, "Apparatus and Method for building environment map according to optimum path setting in autonomous mobile robot", KR10-2008-0029239, Apr. 3, 2008.*

* cited by examiner

APPARATUS AND METHOD FOR BUILDING MAP OF PROBABILITY DISTRIBUTION BASED ON PROPERTIES OF OBJECT AND SYSTEM

CLAIM FOR PRIORITY

This application claims priority to Korean Patent Application No. 10-2012-012065 filed on Oct. 2, 2012 in the Korean Intellectual Property Office (KIPO), the entire contents of which are hereby incorporated by reference.

BACKGROUND

1. Technical Field

Example embodiments of the present invention relate in general to a method of building a map of probability distribution, and more specifically, to a method and apparatus for building a map of probability distribution based on the properties of objects and a system.

2. Related Art

In general, a robot moving indoors and outdoors collects information about the surrounding environment using various kinds of sensors, and builds a map based on the collected information about the surrounding environment. Also, the robot finds an optimal path based on the map, and moves along the optimal path in dynamic and uncertain environments.

For driving of self-driving cars or robots, studies into a method of building a map in which information about the surrounding environment is reflected have been conducted, and as a result of such studies, various map building methods have been proposed.

As methods for building a map in which information about the surrounding environment is reflected, there are a vector field histogram (VFH), a potential field method (PFM), and a probabilistic threat exposure map (PTEM), etc.

The VFH is a real-time path planning algorithm proposed by J. Borenstein. The VFH utilizes a statistical representation of the surrounding environment through the so called histogram grid to represent obstacles.

Also, the VFH deals with uncertainty from sensors and modeling errors, and takes the dynamics and shape of the robot into account, thereby producing sear optimal paths. Lately, the VFH was updated to VFH* through VFH+ to overcome the disadvantages of conventional local path planning algorithms that could not globally ensure optimality.

The PFM is based on finding a target using given information.

In detail, the PFM is an algorithm of producing optimal paths by representing objects on a map in the form of phases, designating the lowest phase as a target, and increasing the phases of obstacles using repulsion.

The PFM has an advantage that it requires a small amount of computation, hot also has a disadvantage that a robot, etc. may fail to produce paths due to local minima. Here, the local minima are cases in which a robot etc. can no longer produce paths because it is stuck in a certain place. For example, the local minimum is a state in which a robot navigating a terrain with uphill and downhill slopes tails into a puddle and can no longer move to another place.

The PTEM is to represent various factors threatening a robot on a map using a Gaussian distribution, and produce optimal paths in real time using the map with the Gaussian distribution in an environment in which various threats exist so that an artificial intelligent apparatus, such as a robot or a self-driving car, can move in teal time.

Meanwhile, conventional methods of building an obstacle map are based on a bottom-up method of recognizing ail objects only as obstacles, regardless of the kinds, etc. of the objects and without taking the kinematic properties of the objects into account, and displaying the objects with different properties as objects with the same property on a map.

Accordingly, since the conventional methods of building the obstacle map do not show dynamical information that can be recognized through tracking of obstacles on the map, it is difficult to accurately calculate times at which an artificial intelligent apparatus arrives obstacles, which also makes it difficult to build an accurate safety map.

Also, since the conventional methods of building the obstacle map represent obstacles only as objects with the same property without taking into account the properties of the objects, for example, the properties of pedestrians, vehicles, two-wheeled vehicles, walls, etc., the built map has low reliability.

Accordingly, since the map and paths produced by the conventional methods of building the obstacle map cannot be determined to be optimal and do not include information such as times at which a robot, etc. arrive obstacles, a system period, etc., it is easy for a robot, etc. to get stack due to a local minimum.

SUMMARY

Accordingly, example embodiments of the present invention are provided to substantially obviate one or more problems due to limitations and disadvantages of the related art.

Example embodiments of the present invention provide an apparatus for building a map of probability distribution, capable of building a map with, high reliability and stability by representing a probability distribution created by reflecting the properties of recognised objects and a system on the map.

Example embodiments of the present invention also provide a method of quickly building a map with a probability distribution fey using object property models in which object properties are reflected and system property models in which system properties are reflected.

In some example embodiments, an apparatus for building a map of probability distribution includes: a sensor information collector configured to collect sensor information from a plurality of sensors; an object recognizer configured to recognize an object by integrating and inferring the sensor information, and to acquire object information which is information about the object; a probability distribution creator configured to determine whether to apply an object property model including at least one of kinematic properties, shape properties, and probabilistic properties in correspondence to the object information, to acquire object properties corresponding to the object information, and to create a probability distribution based on the object properties.

The probability distribution creator may acquire the object properties using the object property model if the object: information has been defined, and acquire the object properties using the object information if the object information has not been defined.

The probability distribution creator may reflect a system property model which is a model about the properties of a system, in addition to the object properties, to create the probability distribution.

The kinematic properties may include the position, velocity, angular position, and angular velocity of the object, and a motion model of the object, and the motion model of the object, may be applied to a defined model.

The shape properties may represent a shape capable of being representative of the object, and include a 2-dimensional/3-dimensional figure.

The probabilistic properties may represent properties capable of exactly representing the object, and include at least one of motion uncertainty and importance of the object.

The system property model may include at least one among a system period, robot speed, and sensor uncertainty.

The apparatus may further include: a map builder configured to represent the probability distribution on the map, and to produce an optimal path in the map on which the probability distribution is represented; and a database configured to store a definition of the object, the object property model, and the system property model.

In other example embodiments, a method for building a map of probability distribution, which is performed by an apparatus for building a map of probability distribution, includes: collecting sensor information from, a plurality of sensors; recognizing an object by integrating and inferring the sensor information, and acquiring object information which is information about the object; determining whether to apply an object property model including at least one of kinematic properties, shape properties, and probabilistic properties in correspondence to the object information, and acquiring object properties corresponding to the object information, and creating a probability distribution based on the object properties.

The creating of the probability distribution may include acquiring the object properties using the object property model if the object information has been defined, and acquiring the object properties using the object information if the object information has not been defined.

The creating of the probability distribution may include reflecting a system property model which is a model about the properties of a system, in addition to the object properties.

The kinematic properties may include the position, velocity, angular position, and angular velocity of the object, and a motion model of the object, and the motion model of the object may be applied to a defined model.

The shape properties may represent a shape capable of being representative of the object, and Include a 2-dimensional/3-dimensional figure.

The probabilistic properties may represent properties capable of exactly representing the object, and include at least one of motion uncertainty and importance of the object.

The system property model may include at least one among a system period, a robot speed, and sensor uncertainty.

The method may further include representing the probability distribution on the map, and producing an optimal path in the map on which the probability distribution is represented.

Therefore, the probability distribution map building apparatus may build a map with high reliability and stability by representing a probability distribution created by reflecting die properties of recognized objects and a system on the map.

Also, the probability distribution map building method may quickly build a map with a probability distribution by using object property models in which object properties are reflected and system property models in which system properties are reflected.

BRIEF DESCRIPTION OF DRAWINGS

Example embodiments of the present invention will become more apparent by describing in detail example embodiments of the present invention with reference to the accompanying drawings. In which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary; the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term, "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e. "between" versus "directly between," "adjacent" versus "directly adjacent" etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an Idealized or overly formal sense unless expressly so defined herein.

Hereinafter, embodiments of the present invention will be described in detail with reference to the appended drawings.

Figure 1:
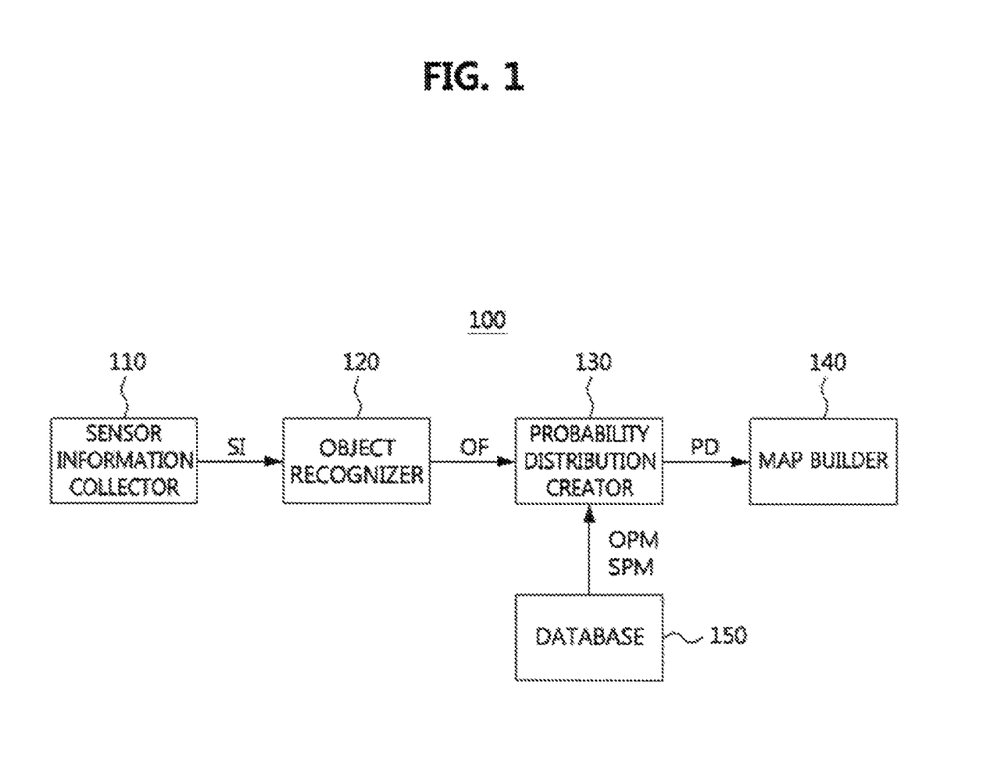
FIG. 1 is a block diagram schematically illustrating an apparatus for building a map of probability distribution based on the properties of objects and a system according to an embodiment of the present invention.

FIG. 1 is a block diagram schematically illustrating an apparatus 100 for building a map of probability distribution based on the properties of objects and a system according to an embodiment of the present invention. Hereinafter, for convenience of description, the apparatus 100 for building the map of probability distribution will fee referred to as a probability distribution map building apparatus 100.

First, as illustrated in FIG. 1, the probability distribution map building apparatus 100 may include a sensor information collector 110, an object recognizer 120, a probability distribution creator 130, a map builder 140, and a database 150.

The sensor information collector 110 collects sensor information SI including information about a surrounding environment collected by different sensors.

Also, the sensor information collector 110 provides the sensor information SI to the object recognizer 120.

At this time, the sensor information collector 110 may collect sensor information SI including information about the surrounding environment of an artificial intelligent apparatus, such as a robot or a self-driving car from various sensors, for example, a single camera, a stereo camera, light detection and ranging (LiDAR), light amplification by stimulated emission of radiation (LASER), and radio detection, and ranging (RADAR), etc.

Here, the stereo camera is a type of camera that can capture two images with respect to a target object at the same time, and photographs the same object with two lenses spaced a predetermined distance apart. When a person sees images acquired by a stereo camera through a stereo viewer, the images will be viewed in three dimensions.

LiDAR is a radar developed using laser light with characteristics close to radio waves, and is the same as a laser radar. In detail, LiDAR is an apparatus emitting pulse laser beams in the sir and receiving their reflections or scatters to measure a distance, an atmospheric phenomenon, based on the reflections or scatters, etc. Generally, a time at which reflected light arrives is measured in units of clock pulses, and the frequency of the clock pulses has resolution of 5 m at 30 MHz, and resolution of 1 m at 150 MHz. The reflection of a beam, the scattering effect of a cloud or smog, atmospheric discontinuity etc. can be measured by the radar technology. Also, LiDAR is used to track a meteorological balloon or a rocket, and can measure a distance to an object up to 30 cm (corresponding to $10^{-9}$).

RADAR sends radio waves to a target object, and estimates the location of the target object using reflected waves received from the target object. Also, RADAR can detect objects using the properties of waves, and estimate the directions of and distances to the objects.

That is, the sensor information collector 110 collects sensor information SI which is information about the surrounding environment from the various sensors as described above, and provides the collected sensor information SI to the object, recognizer 120.

The object recognizer 120 recognizes an object such as an obstacle, acquires information about the recognized object based on the sensor information SI, and provides the information about the recognized object to the probability distribution creator 130. Hereinafter, for convenience of description, the recognized object and the information about the recognized object will be referred to as object information OF.

The object information OF may include the kind of the object, the location of the object, the velocity of the object that can be acquired by tracking the location of the object, etc. The kind of the object may be classified and recognized as a pedestrian, a vehicle, a two-wheeled vehicle, a wall, etc.

Recently, studies into a method for recognizing objects based on sensor information SI collected by integrally using various kinds of sensors have been actively conducted, and such object recognition technology has reached a commercial scale. In other words, technology of recognizing objects indoors and outdoors has been updated to a technical level, in which a robot can determine whether a surrounding obstacle, that is, an object is one of a car, a pedestrian, a two-wheeled car, a wall, etc.

For example, an object is recognized as a vehicle, a pedestrian, or a two-wheeled vehicle, etc. based on images collected by a single camera, a stereo camera, or the like, among the sensor information SI, and the location, distance, etc. of the object are estimated based on information collected by LASER, RADAR, or the like. Actually, cars with a map building apparatus based on such technology as object recognition and location-tracking are offered.

That is, the object recognizer 120 integrates and infers the sensor information SI collected from various sensors to recognize an object, and acquires information about the location, velocity, etc. of the recognized object.

The probability distribution creator 130 receives the object information OF, recognizes object properties based on the object information OF, and creates a probability distribution PD in which the object properties are reflected.

Also, the probability distribution creator 130 reflects system properties created using a system property model (SFM) in the probability distribution PD in addition to the object properties to thereby create a final probability distribution PD. Here, the SFM is a model in which system properties proposed in an embodiment of the present invention are reflected, and the SPM will be described later in more detail with reference to FIG. 3.

In detail, the probability distribution creator 130 searches for the object information OF in the database 150 to determine whether the object corresponding to the object information OF has been defined in the database 150.

If the object corresponding to the object information OF has not been defined in the database 150, the probability distribution creator 130 may create object properties using the object information OF, and create a probability distribution PD in which the created object properties are reflected.

If the object information OF has been defined in the database 150, the probability distribution creator 130 loads object properties which correspond to the object information OF and in which an object property model (OPM) is reflected from the database 150. Then, the probability distribution creator 130 creates a probability distribution PD using the object properties loaded from the database 150.

Here, the OPM is a model in which the object properties proposed in the embodiment of the present invention are reflected, and the OPM will be described later in more detail with reference to FIG. 2.

Figure 2:
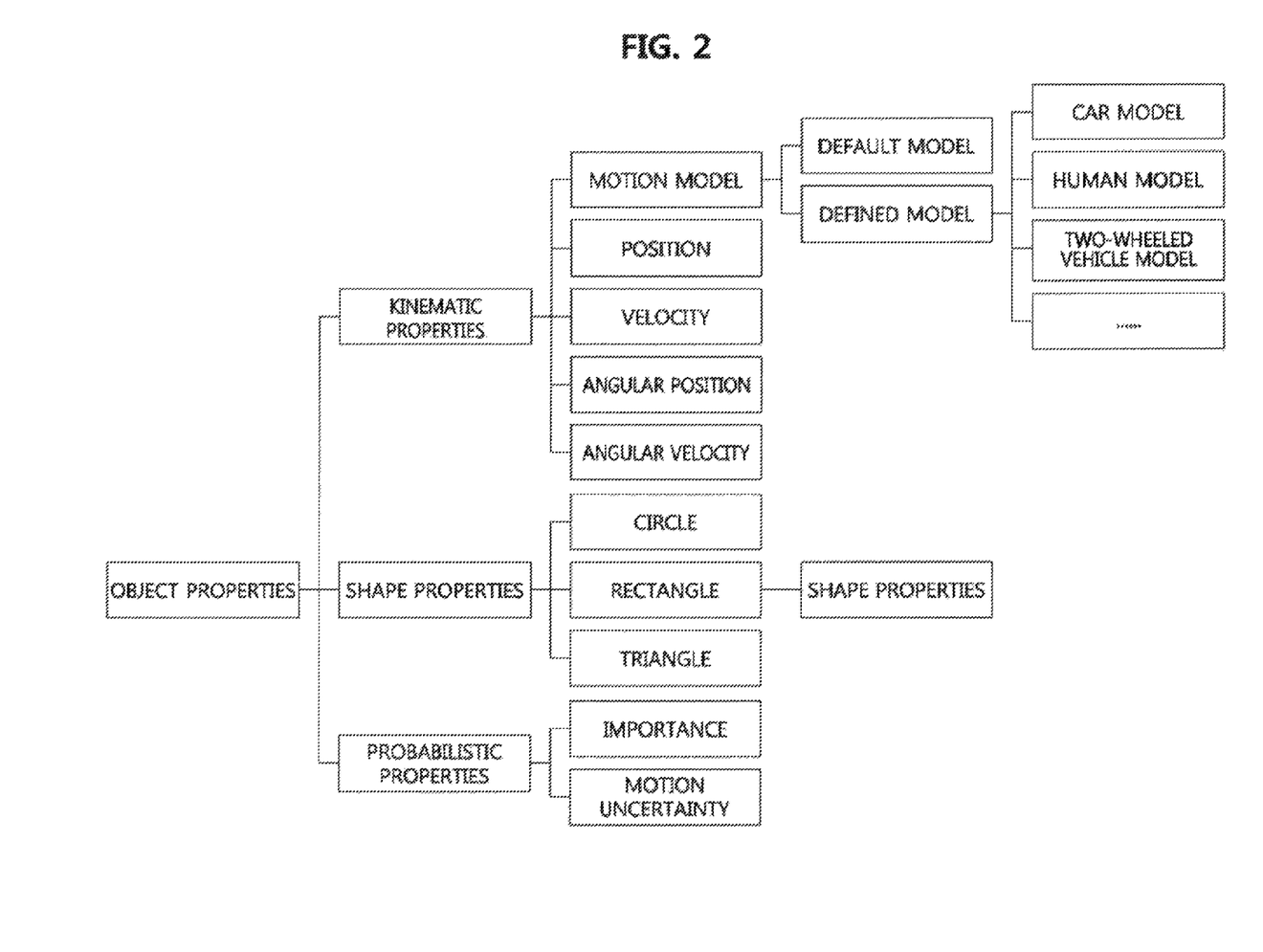
FIG. 2 is a view illustrating an object property model according to an embodiment of the present invention.

FIG. 2 is a view illustrating an OPM according to an embodiment of the present invention.

As illustrated in FIG. 2, object properties may fee classified into kinematic properties, shape properties, and probabilistic properties.

The kinematic properties may include the position of an object, the relative position of the object, and the velocity, angular position, and angular velocity of the object, which can be acquired by tracking the object.

Also, the kinematic properties may further include motion models in which angular properties, such as an angular position, an angular velocity, etc., are reflected.

Here, the motion models are classified into a default model and defined models. In detail, the motion models are applied to defined models, and the default model which, is a basic motion model is applied to non-defined models.

The defined models may be comprised of various models including a car model, a human model, a two-wheeled model, etc.

That is, the OPM represents object properties by reflecting a motion model in which angular properties are reflected so that a probability distribution according to angular properties can be created when object properties in which an angular model is reflected are displayed on a map, thereby making it possible to build a probability distribution map with high reliability.

The shape properties represent the properties of a shape that can be representative of an object based on object information OF. The shape properties are used since it is difficult to extract the exact shape of the object from, sensor information SI collected by sensors.

The shape properties may include a circle, a rectangle, a triangle, etc., which are 2-dimensional figures, and also include a triangular pyramid, a sphere, a rectangular parallelepiped, etc. (not shown), which are 3-dimensional figures.

The probabilistic properties represent object properties that can be probabilistically represented, rather than properties such as position, velocity, or shape. For example, the probabilistic properties may include interesting factors representing the importance, etc. of objects, motion uncertainty representing how uncertain the motion of an object is, etc.

The probabilistic properties may include factors which can each be represented, as a probability among the other properties of objects. In other words, the probabilistic properties may be arbitrary factors that can more accurately represent an object.

As such, by reflecting me probabilistic properties of objects to create a probability distribution, and building a map based on the probability distribution, it is possible to build a map with high stability and reliability.

Meanwhile, although an OPM is classified according to kinematic properties, shape properties, and probabilistic properties, the OPM may be configured to include at least one of the kinematic properties, the shape properties, and the probabilistic properties.

The probability distribution creator 130 further reflects system properties based on an SPM to the probability distribution PD in which the object properties have been reflected, thereby creating a final probability distribution PD.

Hereinafter, an SPM according to an embodiment of the present invention will be described with reference to FIG. 3.

Figure 3:
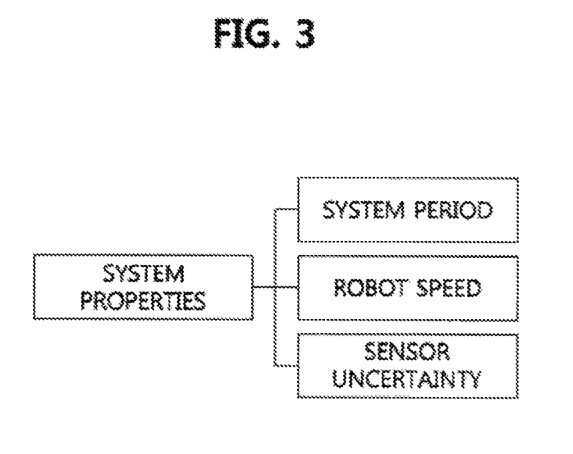
FIG. 3 is a view illustrating a system property model according to an embodiment of the present invention.

FIG. 3 is a view illustrating an SFM according to an embodiment of the present invention.

As illustrated in FIG. 3, the SPM may include a system period, robot speed, and sensor uncertainty.

In detail for example, the system period may be a period in which the probability distribution map building apparatus 100 (see FIG. 1) operates, the robot speed may be the speed of a robot, a self-driving car, a robot cleaner, etc. in which the probability distribution map building apparatus 100 is installed, and the sensor uncertainty may be the error generation rate or accuracy of a sensor.

The SPM may influence a probability distribution according to the relative positions of objects when a map is built, and particularly, the sensor uncertainty may influence a deviation in probability distribution.

Referring again to FIG. 1, the map builder 140 represents the probability distribution PD received from the probability distribution creator 130 on a map.

Then, the map builder 140 reflects environmental properties, for example, barrier curbs, etc. to the map in which the probability distribution PD has been reflected, thereby building a final map.

Then, the map builder 140 produces an optimal path using a path planning algorithm based on the map, and provides the optimal path to an artificial intelligent apparatus such as a robot.

Hereinafter, the map builder 140 according to an embodiment of the present invention will be described in detail with reference to FIG. 4.

Figure 4:
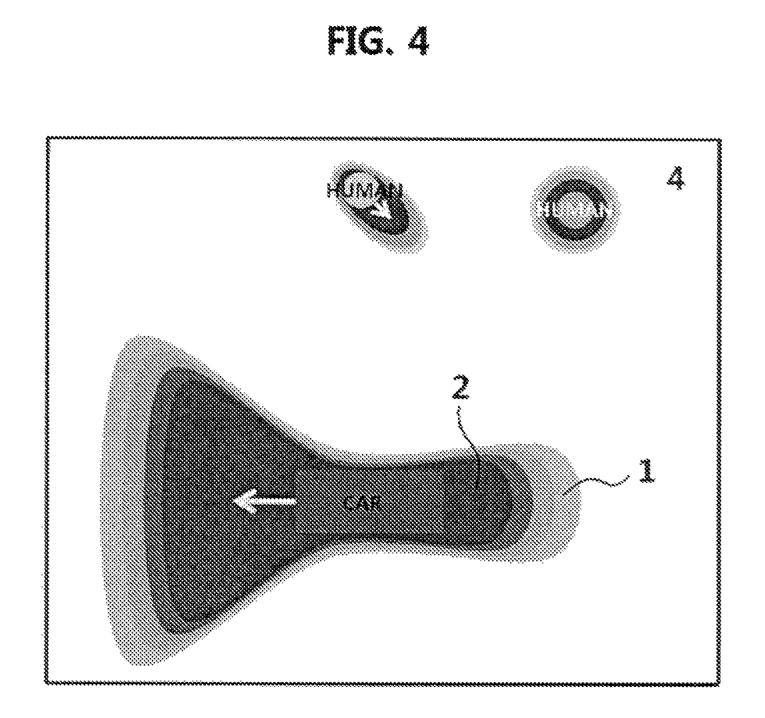
FIG. 4 illustrates an example in which a probability distribution, created by reflecting only kinematic and shape properties among object properties is represented on a map.

FIG. 4 illustrates an example in which a probability distribution (PD of FIG. 1) created by reflecting only kinematic properties and shape properties among object properties is represented on a map.

That is, FIG. 4 shows an example of a map in which a car and two persons are probabilistically distributed.

In detail, for example, persons whose shapes cannot be exactly recognized from sensor information SI are represented as circles, and a car is represented in the form of the section of a gourd-shaped bottle lying on its side.

Also, a plurality of areas surrounding each object in the map are represented with different brightness levels of color, which gradually decrease. Here, the different brightness levels indicate degrees of risk. For example, a high brightness level indicates a high degree of risk, and a low brightness level indicates a low degree of risk. In detail, in the case of the car illustrated in FIG. 4, an area 1 having the lowest brightness level has a low degree of risk although there is still some degree of risk, and an area having the highest brightness level, in which the car is currently located, has the highest degree of risk.

Also, in the map, the moving directions and relative velocities of objects are represented as arrows.

In detail, directions indicated by the arrows represent directions in which the objects move, and the lengths of the arrows represent the relative velocities of the objects. In detail, for example, the ear's arrow indicating the west represents that the car moves westward, and a human's arrow indicating the southeast represents that the human moves southeastward. A human having no arrow represents that he/she does not move.

Also, since the car's arrow is longer than the human's arrow, the car's moving velocity is determined to be faster than the human's moving velocity.

As such, in the current embodiment, by reflecting object properties including the shape and kinematic properties of objects, a map with high reliability and safety may be built.

Referring again, to FIG. 1, the database 150 stores information about definitions of various objects, and also stores an OPM and an SFM to provide the OPM and SPM to the probability distribution creator 130.

Hereinafter, a method for building a map of probability distribution according to an embodiment of the present invention will be described with reference to FIG. 5.

Figure 5:
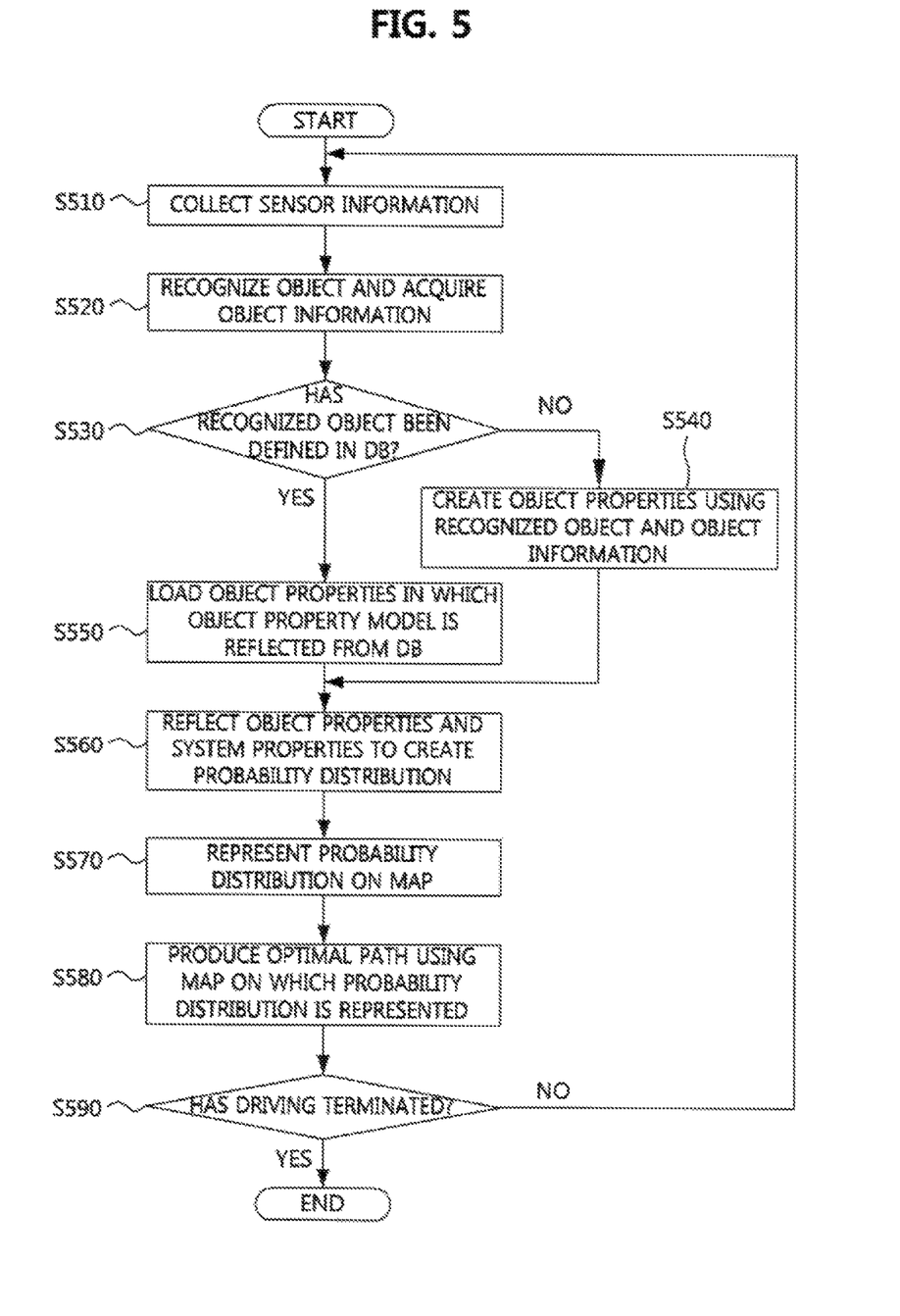
FIG. 5 is a flowchart illustrating a method in which the apparatus for building the map of probability distribution builds a map of probability distribution according to an embodiment of the present invention.

FIG. 5 is a flowchart illustrating a method in which the probability distribution map building apparatus 100 (see FIG.

1) builds a map of probability distribution according to an embodiment of the present invention.

First sensor information SI is collected from various sensors (S510).

Successively, the collected sensor information SI is integrated and inferred to recognize an object, and object information including the location, velocity, etc. of the recognised object is acquired (S520).

Then, it is determined whether the recognised object has been defined in a database DB based on the object information (S530).

If the recognized object has not been defined in the database DB, object properties are created based on the recognized object and the object information (S540).

Meanwhile, if the recognized object has been defined in the database DB, object properties corresponding to the recognized object and the object information, in which an OPM is reflected, are loaded from the database DB (S550).

Here, the OPM may be comprised of at least one of kinematic properties, shape properties, and probabilistic properties.

Then, a probability distribution in which the acquired object properties have been reflected is created. At this time, a probability distribution, in which system properties have been reflected in addition to the object properties may be created (S560).

Then, the probability distribution is represented on a map (S570), and the map on which the probability distribution is represented is used to produce an optimal path (S580).

Then, it is determined whether driving of an artificial intelligent apparatus, such as a robot, a robot cleaner, etc., has terminated (S590). If driving of the artificial intelligent apparatus has terminated, map building terminates, and if the artificial intelligent apparatus continues to move, the process returns to operation S510 in order to restart the process of building a map of probability distribution.

As described above, in the apparatus and method for building a map of probability distribution in which object properties and system properties are reflected, objects existing in a surrounding environment are recognized in order for a robot or a self-driving car to autonomously move.

Also, in the probability distribution map building apparatus and method, a map in which probabilistic degrees of safety are represented by reflecting pre-stored or measured object properties on the recognized objects is built.

Accordingly, in the probability distribution map building apparatus and method, a map can be built with higher reliability than a conventional map showing only objects, and the efficiency and stability of path planning can be improved.

Also, in the embodiments as described above, although the individual components are shown and described as different blocks, the components may be integrated into a single block. For example, the components may be integrated into a controller, a processor, etc. to perform a series of operations.

While the example embodiments of the present invention and their advantages have been described in detail, it should be understood that various changes, substitutions and alterations may be made herein without departing from the scope of the invention.

What is claimed is:

1. An apparatus for building a map of probability distribution, comprising:
    a sensor information collector configured to collect sensor information from a plurality of physical sensors;
    an object recognizer configured to recognize an object by integrating and inferring the sensor information, and to acquire object information which is information about the object;
    a probability distribution creator configured to determine whether to apply an object property model including at least one of kinematic properties, shape properties, and probabilistic properties in correspondence to the object information, to acquire object properties corresponding to the object information, and to create a probability distribution based on the object properties, and
    a database configured to store definition of the object, the object property model, and a system property model which is a model about properties of a system,
    wherein the probability distribution creator searches for the object information in the database to determine whether the object corresponding to the object information has been defined in the database,
    wherein the probability distribution creator acquires the object properties using the object property model if the object information has been defined in the database, and creates the object properties using the object information of the recognized object if the object information has not been defined in the database.

2. The apparatus of claim 1, wherein the probability distribution creator reflects the system property model, in addition to the object properties, to create the probability distribution.

3. The apparatus of claim 1, wherein the kinematic properties include the position, velocity, angular position, and angular velocity of the object, and a motion model of the object, and the motion model of the object is applied to a defined model.

4. The apparatus of claim 1, wherein the shape properties represent a shape capable of being representative of the object, and include a 2-dimensional or 3-dimensional figure.

5. The apparatus of claim 1, wherein the probabilistic properties represent properties capable of exactly representing the object, and include at least one of motion uncertainty and importance of the object.

6. The apparatus of claim 2, wherein the system property model includes at least one among a system period, robot speed, and sensor uncertainty.

7. The apparatus of claim 1, further comprising:
    a map builder configured to represent the probability distribution on the map, and to produce an optimal path in the map on which the probability distribution is represented.

8. A method for building a map of probability distribution, which is performed by an apparatus for building a map of probability distribution, comprising:
    collecting sensor information from a plurality of physical sensors;
    recognizing an object by integrating and inferring the sensor information, and acquiring object information which is information about the object; and
    determining whether to apply an object property model including at least one of kinematic properties, shape properties, and probabilistic properties in correspondence to the object information, and acquiring object properties corresponding to the object information, and creating a probability distribution based on the object properties,
    wherein the object information is used to determine whether the recognized object has been defined in a database configured to store definition of the object, the object property model, and a system property model which is a model about properties of a system, and wherein the creating of the probability distribution comprises acquiring the object properties using the object property model if the object information has been defined in the database, and creating the object properties using the object information of the recognized object if the object information has not been defined in the database.

9. The method of claim 8, wherein the creating of the probability distribution comprises reflecting the system property model, in addition to the object properties.

10. The method of claim 8, wherein the kinematic properties include the position, velocity, angular position, and angular velocity of the object, and a motion model of the object, and the motion model of the object is applied to a defined model.

11. The method of claim 8, wherein the shape properties represent a shape capable of being representative of the object, and include a 2-dimensional or 3-dimensional figure.

12. The method of claim 8, wherein the probabilistic properties represent properties capable of exactly representing the object, and include at least one of motion uncertainty and importance of the object.

13. The method of claim 9, wherein the system property model includes at least one among a system period, a robot speed, and sensor uncertainty.

14. The method of claim 9, further comprising representing the probability distribution on the map, and producing an optimal path in the map on which the probability distribution is represented.

* * * * *